INVENTORS.
Edward P. Harris
Cletus L. Moorman
Melvin V. Roode
Richard W. Lyday

Their Attorney

United States Patent Office 3,219,733
Patented Nov. 23, 1965

3,219,733
METHOD OF EXTRUDING A SMOOTH SURFACED SPONGE VINYL RESIN ARTICLE
Edward P. Harris, Dayton, Cletus L. Moorman, Trotwood, Melvin V. Roode, Dayton, and Richard W. Lyday, Brookville, Ohio, assignors to General Motors Corporation, Detroit, Mich., a corporation of Delaware
Filed Sept. 7, 1962, Ser. No. 222,098
1 Claim. (Cl. 264—48)

This invention directed to a method of extruding blown plastics and is particularly concerned with blown vinyls that are capable of being extruded.

It is, therefore, the main object of the invention to provide a method for a plastic material which can be extruded to shape and simultaneously blown and wherein a uniform smooth skin is provided on the surface of the part.

In carrying out the above object it is a further object of the invention to provide a method for forming extruded blown vinyl parts wherein the extrusions may be continuous and wherein a smooth surfaced article is formed.

In order to produce parts as set forth above it is a further object of the invention to provide apparatus such as an extruder wherein means are provided for lubricating the external surface of the extrusion during its formation for reducing the possibility of melt-fracture as the part leaves the die and wherein the part is continuously quenched immediately thereafter.

Further objects and advantages of the present invention will be apparent from the following description, reference being had to the accompanying drawings wherein preferred embodiments of the present invention are clearly shown.

Heretofore it has been difficult, if not impossible, to extrude blown vinyl parts. Vinyl material when sufficiently hot to properly extrude does not appear to have sufficient strength to contain the gases used to blow the same whereby the vinyl surface of the extruded or blown part is pebbly and often covered with small eruptions caused by gas bubbles near the surface thereof. This condition has necessitated the molding of most blown vinyl parts whereby the mold prevents eruptions at the surface thereof and offers a smooth surfaced spongy article.

It is apparent that extruding of a part when long lengths thereof are desired is much less expensive than molding the same part and entails less work.

We have discovered that vinyl materials, for example polyvinyl chloride resins, polyvinyl acetate, polyvinyl-chloride-acetate, vinylidene chloride, etc., may be compounded so that they will blow and may be processed so that they can be extruded satisfactorily and still maintain a smooth uninterrupted surface. This is accomplished by lubricating the surfaces of the part immediately as it is extruded while maintaining some pressure on the surface for reducing the shear of the material as it crosses the die-land. This reduces the possibility of melt-fracture which is common in vinyl materials. The part is immediately quenched thereafter to further improve the surface.

We have also found that the material is best heated by means of heat generated during the extrusion rather than by heat induced therein by heated dies and the like. In the latter case the heat is not uniform nor is the rate of penetration sufficiently fast to produce a uniform blow. We have found that by operating the extruder at a faster rate of screw speed it is possible to induce heat by friction into the extruded material whereby the blow is uniform and wherein the temperature of any cross section of the extruded part is substantially uniform throughout. This produces a much better blow than when the die is heated from the outside since in this instance the blowing agent adjacent the surface tends to blow while the blowing agent beneath the surface and remote from the heated parts of the die does not blow properly causing non-uniform porosity in the part.

Figure 1:
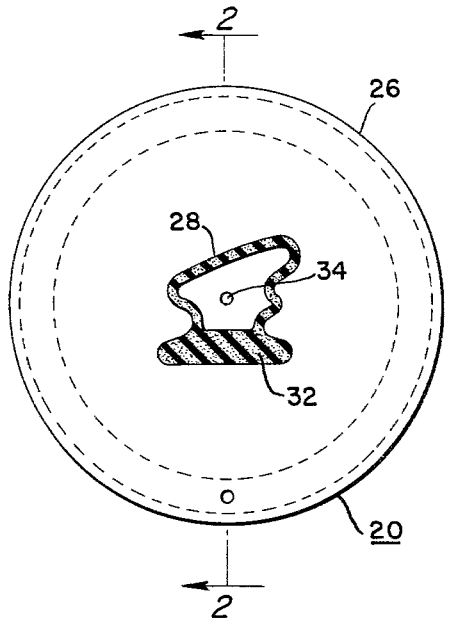
FIG. 1 is a cross section taken on line 1—1 of FIG. 2.
Figure 2:
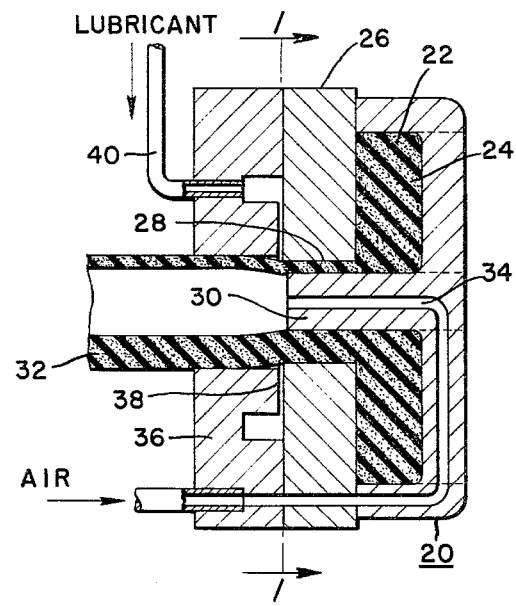
FIG. 2 is a cross section of a portion of an extrusion die taken on line 2—2 of FIG. 1.
Figure 3:
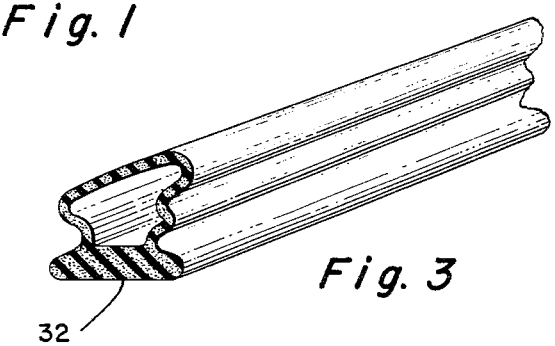
FIG. 3 is a section of a blown vinyl sealing strip as made in the die shown in FIGS. 1 and 2 wherein the strip is shown in perspective and partly in section.
Figure 4:
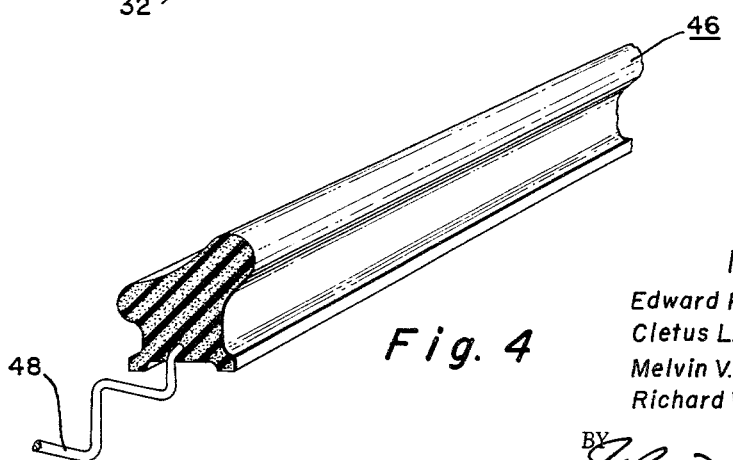
FIG. 4 is a perspective view partly in section of another type of sealing strip which may be formed by the method and in the apparatus described.

Referring specifically to the drawings, FIG. 2 shows an extrusion die or head at 20 which includes a supply duct 22 filled with a polyvinyl chloride compound 24 under pressure as supplied by a screw not shown. Centrally located in a die plate 26 is a die opening 28. A core 30 is provided within the opening 28 and is supported by the back portion of the head or housing 20. As the screw forces the polyvinyl chloride compound outwardly it passes around the core 30 and through the opening 28 to form an extrusion having a cross sectional shape as shown in FIG. 1. A long length of this material produces a sealing strip 32 as shown in FIG. 3.

Centrally located within the core 30 is a duct 34 which is connected to a source of compressed air or other compressed gas. This compressed gas is fed into the extrusion to maintain the same in expanded form against the walls of the forward die plate 36. The pressure should be adjusted to accomplish the desired results. In order to lubricate the passage of the extrusion through the die plate 36 and to reduce the shear of the material as it crosses the lands thereof, a relief passage 38 is provided. This relief passage 38 is of annular shape and is connected by a duct 40 to a source of lubricant. The lubricant is pumped through the relief passage and oozes out around the extrusion maintaining the same in lubricated condition as it passes through the die plate 36.

Immediately after the extruded material emerges from the die it is quenched in water at about 60° F. Any other suitable quenching medium may be used although water appears to be fully satisfactory. This quench cools and sets the material and improves the surface characteristics thereof.

In place of a hollow extrusion such as the sealing strip 32, an extrusion such as shown at 46 may be made in the same type of equipment, the only difference being that the compressed air duct 34 is not necessary. In this instance a sealing strip 46 is shown which has a solid cross section and includes a wire reinforcement 48 passing therethrough if desired. When the wire is used it may be fed through the back of the die through a passage similar to passage 34 so that it is covered by the extruded material as it is formed. In either case, the lubricant passage is required to provide the desired surface on the article.

A general recipe for a suitable compound is as follows:

| Ingredient: | Parts by weight |
|---|---|
| Thermoplastic resinous material | 125 |
| Stabilizer (with catalyst, if required) | 1–4 |
| Plasticizer | 20–35 |
| Fatty acid | 0.–1.0 |
| Blowing agent | 1–4 |

A more specific recipe for a vinyl compound includes:

| Ingredient: | Parts by weight |
| --- | --- |
| Polyvinyl chloride or acetate or mixtures thereof | 100 |
| Rubbery material taken from the class consisting of copolymers of butadiene with acrylonitrile and/or styrene | 30–50 |
| Stabilizer (with catalyst, if required) | 1–4 |
| Plasticizer | 20–35 |
| Fatty acid | 0.–1.0 |
| Blowing agent | 1–4 |

A specific recipe for a polyvinyl chloride resin which offers excellent results is as follows:

| Ingredient: | Parts by weight |
| --- | --- |
| Polyvinyl chloride resin (Vyogen #161) | 100.00 |
| Butadiene acrylonitrile rubber (Chemigum N–8) | 40.00 |
| Barium-cadmium ester (Mark W–S) | 2.00 |
| Chelator (catalyst for stabilizer) (Mark C) | .75 |
| Dioctylazelate | 60.00 |
| Butyl benzyl thiolate (Santicizer #160) | 25.00 |
| Epoxidized soy bean oil (Monoplex S–73) | 5.00 |
| Stearic acid | .50 |
| Azodicarbonamide (Celogen AZ) (blowing agent) | 1.20 to 3.60 |

In the above recipe the barium-cadmium ester is used as a stabilizer, the dioctylazelate is a plasticizer for low temperature flexibility together with the butyl benzol thiolate and the epoxidized soy bean oil. The stearic acid is used as a lubricant.

To this formulation various ingredients may be added for light and heat stability if desired, as is well-known in the art. In the preferred embodiment the blowing agent is used at the high end of the range wherein a polyvinyl chloride sponge having a density of from 40 to 45 lbs. per cu. ft. is formed. Obviously, if the percent of blowing agent is reduced the weight of the sponge per cubic foot rises.

The lubricant used to lubricate the extrusion and supplied through passage 40 may be a polyglycol such as polypropylene glycol or glycerine. We prefer to use glycerine due to greater ease in washing the lubricant from the strip. The lubricant may be supplied to the die under pressures ranging from 1 to 20 lbs. per sq. in. and preferably at about 15 to 20 lbs. per sq. in. where the clearance in the passage 38 is in the order of .001–.002 inch. In all cases the supply of lubricant should be sufficient to properly cover and lubricate the extrusion.

The screw speed on the extruder may be varied as desired. Speeds from 15 to 70 feet of strip per minute with a melt stream temperature of from 300 to 350 degrees are usually satisfactory, although we prefer to use from 50 to 70 feet per minute with a melt stream temperature from 330 to 350° F. adjacent the mouth of the die. Due to the relatively high screw speed, heat will be generated by friction as heretofore noted, which offers greater uniformity of temperature and a better and more uniform blow.

The extruder may be either of the cross head variety or a straight through type of extruder or any other suitable design. The particular design is of no great moment except with respect to the improvement of lubricating the die after the extrusion is formed to reduce the possibility of melt-fracture.

Other types of vinyl resins may be used with similar satisfactory results and it is also apparent that other types of resin formulations may be used as is well-known in the art, it only being necessary to provide the resin with suitable stabilizers and plasticizers together with a blowing agent which will decompose within the temperature ranges that are available. Similarly, rates of screw feed and temperatures may be varied to produce specific results as is well-known in the art. The particular temperatures and feeds noted are particularly useful in connection with the sealing strip as described. In all instances, these variables together with the lubricant feed should be arrived at by trial for the specific cross section being produced, it being understood that by proper choice of temperatures, speeds, etc., it is possible to form an extrusion of a blown vinyl material wherein a smooth uninterrupted surface may be formed.

While the forms and embodiments of the present invention as herein disclosed, constitute preferred forms, it is to be understood that other forms might be adopted.

What is claimed is as follows:

In a method for forming an indeterminate length of flexible, resilient, spongy vinyl material, wherein the material has a smooth outer surface and a relatively uniform cellular interior, the steps comprising; providing an expandable vinyl compound including a solid blowing agent dispersed therethrough which is adapted to gasify at a predetermined elevated temperature for forming cells within said vinyl compound, extruding said vinyl compound through a die having the cross sectional shape desired and of an area less than that ultimately desired, heating said compound as it passes through said die to a temperature of from 330 to 350° F. solely by heat induced therein due to friction of the compound passing through the extruder and die for gasifying said solid blowing agent, immediately supplying a liquid lubricant under pressure to the external surface of the extruded material as it is extruded from said die while simultaneously expanding the extruded shape in cross sectional area through a second die to the size ultimately desired, and then quenching the extrusion to cool the same.

References Cited by the Examiner

UNITED STATES PATENTS

| 2,256,483 | 9/1941 | Johnston | 264—54 XR |
| 2,512,844 | 6/1950 | Weber | 18—14 |
| 2,537,977 | 1/1951 | Dulmage | 264—53 |
| 2,579,815 | 12/1951 | Gialanella | 18—12 |
| 2,597,552 | 5/1952 | Weber | 18—12 |
| 3,030,623 | 4/1962 | Lehti et al. | 18—59 |
| 3,058,162 | 10/1962 | Grabowski | 18—48 |
| 3,080,612 | 3/1963 | Buchmann | 18—48 |
| 3,095,608 | 7/1963 | Munsell | 18—14 XR |

FOREIGN PATENTS

| 595,276 | 3/1960 | Canada. |

OTHER REFERENCES

Fisher, E. G.: Extrusion of Plastics, New York, Interscience Publishers, London, Iliffe & Sons, 1958, pp. 38–41, TP 986 A2F56.

ALEXANDER H. BRODMERKEL, *Primary Examiner.*

MORRIS LIEBMAN, *Examiner.*